(12) United States Patent
Haikin et al.

(10) Patent No.: US 7,995,237 B2
(45) Date of Patent: Aug. 9, 2011

(54) COLOR TRANSFORMATION WITH BLACK PRESERVATION

(75) Inventors: John S. Haikin, Fremont, CA (US); Todd D. Newman, Palo Alto, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 1281 days.

(21) Appl. No.: 11/039,724

(22) Filed: Jan. 18, 2005

(65) Prior Publication Data

US 2006/0158669 A1  Jul. 20, 2006

(51) Int. Cl.
*G06F 15/00* (2006.01)
(52) U.S. Cl. ......... 358/1.9; 358/2.1; 358/3.04; 358/515; 358/518; 358/519; 358/529; 382/162; 382/167
(58) Field of Classification Search .................. 358/1.9, 358/2.1, 3.04, 529; 382/162, 167
See application file for complete search history.

(56) References Cited

U.S. PATENT DOCUMENTS

| | | | | |
|---|---|---|---|---|
| 5,666,436 | A * | 9/1997 | Eames | 382/167 |
| 5,778,160 | A * | 7/1998 | Smith | 358/1.9 |
| 6,002,795 | A * | 12/1999 | Eames et al. | 382/167 |
| 6,072,901 | A * | 6/2000 | Balonon-Rosen et al. | 382/167 |
| 6,137,594 | A * | 10/2000 | Decker et al. | 358/1.9 |
| 6,137,596 | A * | 10/2000 | Decker et al. | 358/1.9 |
| 6,152,999 | A * | 11/2000 | Erdtmann et al. | 106/31.6 |
| 6,281,984 | B1 | 8/2001 | Decker et al. | 358/1.9 |
| 6,775,030 | B2 * | 8/2004 | Krabbenhoft et al. | 358/1.9 |
| 6,778,300 | B1 | 8/2004 | Kohler | 358/529 |
| 6,873,434 | B1 | 3/2005 | Kohler et al. | 358/1.9 |
| 6,985,252 | B1 | 1/2006 | Kubo | 358/1.9 |
| 7,019,868 | B2 | 3/2006 | Chang et al. | 358/2.1 |
| 7,046,393 | B2 * | 5/2006 | Zeng | 358/1.9 |
| 7,053,910 | B2 * | 5/2006 | Newman | 345/604 |

(Continued)

FOREIGN PATENT DOCUMENTS

EP    1079606 A2 *  2/2001

(Continued)

OTHER PUBLICATIONS

Huanzhao Zeng, CMYK Transformation with Black Preservation in Color Management System, 2002, SPIE, vol. 4663, pp. 143-149.*

(Continued)

*Primary Examiner* — Twyler L Haskins
*Assistant Examiner* — Miya J Cato
(74) *Attorney, Agent, or Firm* — Fitzpatrick, Cella, Harper & Scinto

(57) ABSTRACT

The present invention transforms a source device colorant value to a destination device colorant value, by determining whether all non-black colorant values of the source device colorant value are zero, transforming the source device colorant value to a colorimetric value using a source device model, transforming the colorimetric value to a gamut-mapped colorimetric value using a user-selectable gamut-mapping model, and selecting a destination device colorant value based on the determination. In a case where all of the non-black colorant values of the source device colorant value are zero, the destination device colorant value is selected so that its black colorant value reproduces a lightness of the gamut-mapped colorimetric value, and all of its non-black colorant values are zero. Otherwise, the destination device colorant value is selected so that a combination of its non-black and black colorant values reproduces the gamut-mapped colorimetric value. Accordingly, black content is preserved while accommodating a user-selectable gamut-mapping model.

16 Claims, 5 Drawing Sheets

U.S. PATENT DOCUMENTS

| | | | |
|---|---|---|---|
| 7,177,047 B2 * | 2/2007 | Rozzi | 358/1.9 |
| 7,199,905 B2 * | 4/2007 | Sharma | 358/3.04 |
| 2002/0113982 A1 | 8/2002 | Chang et al. | 358/1.9 |
| 2003/0020727 A1 * | 1/2003 | Newman | 345/604 |
| 2003/0043166 A1 * | 3/2003 | Kumada et al. | 345/589 |
| 2003/0072016 A1 | 4/2003 | Dalrymple et al. | 358/1.9 |
| 2003/0210414 A1 * | 11/2003 | Kuno | 358/1.9 |
| 2004/0109180 A1 * | 6/2004 | Braun et al. | 358/1.9 |
| 2004/0126009 A1 | 7/2004 | Takenaka et al. | 382/162 |
| 2004/0196475 A1 * | 10/2004 | Zeng et al. | 358/1.9 |
| 2005/0195415 A1 * | 9/2005 | De Baer | 358/1.9 |
| 2005/0219661 A1 * | 10/2005 | Hirabayashi | 358/518 |
| 2005/0259109 A1 * | 11/2005 | Stokes | 345/590 |

FOREIGN PATENT DOCUMENTS

EP    1156668 A2 * 11/2001

OTHER PUBLICATIONS

Tomasz J. Cholewo, Black generation using lightness scaling, Jan. 2000, SPIE Conference on Color Imaging, vol. 3963, pp. 323-328.*
U.S. Appl. No. 09/571,975 (Kohler et al.), pending, Dec. 6, 2007.

* cited by examiner

COLOR TRANSFORMATION WITH BLACK PRESERVATION

BACKGROUND OF THE INVENTION

1. Field of the Invention

This invention relates to the field of color transformation, and specifically relates to a color management system that preserves black content when transforming from a source device color space to a destination device color space, while accommodating user-selection of a gamut-mapping model for the transformation.

2. Description of the Related Art

Color management systems are used for transforming color image data from the color space of a source device to the color space of a destination device. Generally, in color management systems such as the system of the International Color Consortium (ICC), the component colors of source color data are first transformed from a device-dependent color space for the source device into a device-independent profile connection space (PCS), such as CIELAB or CIEXYZ color space. The color data is then transformed from the PCS color space into a device dependent color space for the destination device.

Many times, particularly in color proofing operations, it is desirable to transform color image data from a source color space that includes a black colorant value to a destination color space that also includes a black colorant value, such as from the color space of one type of color printer to the color space of another type of color printer. Examples of such color spaces include CMYK, which is a four-component color space comprising cyan, magenta, yellow and black, and CMYKOG, which is a six-component space that also includes orange and green. When converting colors from such a source device to a destination device, it is often desirable to preserve the black component (K) such that the amount of black present in the source image is pleasingly reflected in the destination image.

An important aspect of black preservation is the ability to preserve black-only content, i.e. the data within an image composed solely of black, or purely neutral gray levels between white and black. For example, a portion of a source image may be comprised only of black or gray text or lines, which is represented in the source CMYK data using only the K component. If the black-only content is not preserved, the corresponding portion in the destination image is represented as a combination of C, M and/or Y components, and not just the K component. However, the combination necessary to achieve a pleasingly acceptable black appearance is very delicate, and if the combination is not correct, a brownish, muddy appearance can result. Furthermore, the printing of black text and/or other objects with fine detail using multiple colors of inks can result in blurred text and/or objects due to slight errors in alignment while printing. Accordingly, it is desirable to preserve the black-only content of the source image for accurate representation in the corresponding destination image.

In addition, some color management systems contain a user-selectable gamut-mapping model, which allows a user to select a particular gamut-mapping algorithm. In such systems, the user selects the algorithm for transforming source color data to destination color data that might otherwise map to an out-of-gamut color in the destination color space.

However, when the user selects the gamut-mapping algorithm, he/she also expects that black-only content is preserved, regardless of the gamut-mapping algorithm that is selected. Although prior attempts to preserve black-only content have been made, none are seen to address the problem of preserving black-only content in a color management system with user-selectable gamut-mapping.

SUMMARY OF THE INVENTION

The present invention addresses the foregoing problems by determining whether all of the non-black colorant values of a source device colorant value are zero, transforming the source device colorant value to a colorimetric value using a source device model, transforming the colorimetric value to a gamut-mapped colorimetric value using a user-selectable gamut-mapping model, and selecting a destination device colorant value based on the determination. Specifically, in a case where all of the non-black colorant values of the source device colorant value are zero, the destination device colorant value is selected so that a black colorant value of the destination device colorant value reproduces a lightness of the gamut-mapped colorimetric value, and all of the non-black colorant values of the destination device colorant value are zero. In a case where not all of the non-black colorant values of the source device colorant value are zero, the destination device colorant value is selected so that a combination of the non-black and black colorant values of the destination device colorant value reproduces the gamut-mapped colorimetric value.

According to one aspect of the invention, in a color management system having a user-selectable gamut mapping model, a method is provided for transforming a source device colorant value in a source device colorant space to a corresponding destination device colorant value in a destination device colorant space, wherein the source and destination device colorant values each have non-black colorant values and a black colorant value, and wherein the source and destination device colorant spaces are colorimetrically characterized by source and destination device models. A determination is made as to whether all of the non-black colorant values of the source device colorant value are zero. The source device colorant value is then transformed to a colorimetric value using the source device model, and the colorimetric value is transformed to a gamut-mapped colorimetric value using the user-selectable gamut-mapping model. A destination device colorant value is then selected based on the determination. In a case where all of the non-black colorant values of the source device colorant value are zero, the destination device colorant value is selected so that the black colorant value of the destination device colorant value reproduces a lightness of the gamut-mapped colorimetric value, and all of the non-black colorant values of the destination device colorant value are zero. In a case where not all of the non-black colorant values of the source device colorant value are zero, the destination device colorant value is selected so that a combination of the non-black and black colorant values of the destination device colorant value reproduces the gamut-mapped colorimetric value.

Preferably, a flag value is set based on whether all of the non-black colorant values of the source device colorant value are zero, and wherein the destination device colorant value is selected in accordance with the flag value.

It is also preferred that, in the case where all of the non-black colorant values of the source device colorant value are zero, the gamut-mapped colorimetric value is transformed to the destination device colorant value, with the black colorant value of the destination device colorant value reproducing a lightness of the gamut-mapped colorimetric value, and all of the non-black colorant values of the destination device colorant value being zero.

In addition, it is preferred that in the case where all of the non-black colorant values of the source device colorant value are zero, the black colorant value of the destination device colorant value reproduces a lightness of the gamut-mapped colorimetric value by obtaining mapping information from a gamut boundary for the destination device model. The mapping information from the gamut boundary for the destination device model is preferably implemented as a table of colors representing a neutral ramp of the destination device model.

In transforming the colorimetric value to the gamut-mapped colorimetric value using the user-selectable gamut-mapping model, it is preferred that the colorimetric value is transformed to an appearance space value, the appearance space value is gamut-mapped using the user-selectable gamut-mapping model, and the appearance space value is transformed to the gamut-mapped colorimetric value. The appearance space value is preferably transformed to the gamut-mapped colorimetric value by using a colorimetric space which has a luminance value, such as $L^*, u^*, v^*$.

Preferably, the source and destination device colorant spaces are CMYK. It is also preferred that the source device model corresponds to a first color printer, and the destination device model corresponds to a second color printer.

In yet another aspect of the invention, source device colorant value data in a source device colorant space is transformed to destination device colorant value data in a destination device colorant space, wherein the source device colorant value data and destination device colorant value data comprise plural source device colorant values and plural destination device colorant values, and wherein the source and destination device colorant spaces are colorimetrically characterized by source and destination device models. Such transformation of colorant value data is preferably performed by transforming each of the plural source color device colorant values to a corresponding destination device colorant value in accordance with the above-mentioned aspect of the invention. A look-up table is preferably generated to store each of the plural source device colorant values and corresponding destination device colorant values.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

The present invention is generally directed to a color management system for managing color data representing an image from a colorant space corresponding to a source device, into a colorant space corresponding to a destination device. Specifically, the color management system of the present invention preserves the representation of black-only pixels (pixels having zero values for the non-black components) in the source color data during transformation into destination color data. The color data representing such black-only pixels is transformed such that a destination value is selected so that the black component reproduces a lightness of a gamut-mapped colorimetric value, and the non-black components are set to zero.

The color management system according to the present invention may be incorporated in an output device driver for execution in a computing device, such as a printer driver, embedded in the firmware of an output device, such as a printer, or provided in a stand-alone color management application for use on a general purpose computer. It can be appreciated that the present invention is not limited to these embodiments and that the present invention may be used in other environments in which color management is used.

Figure 1:
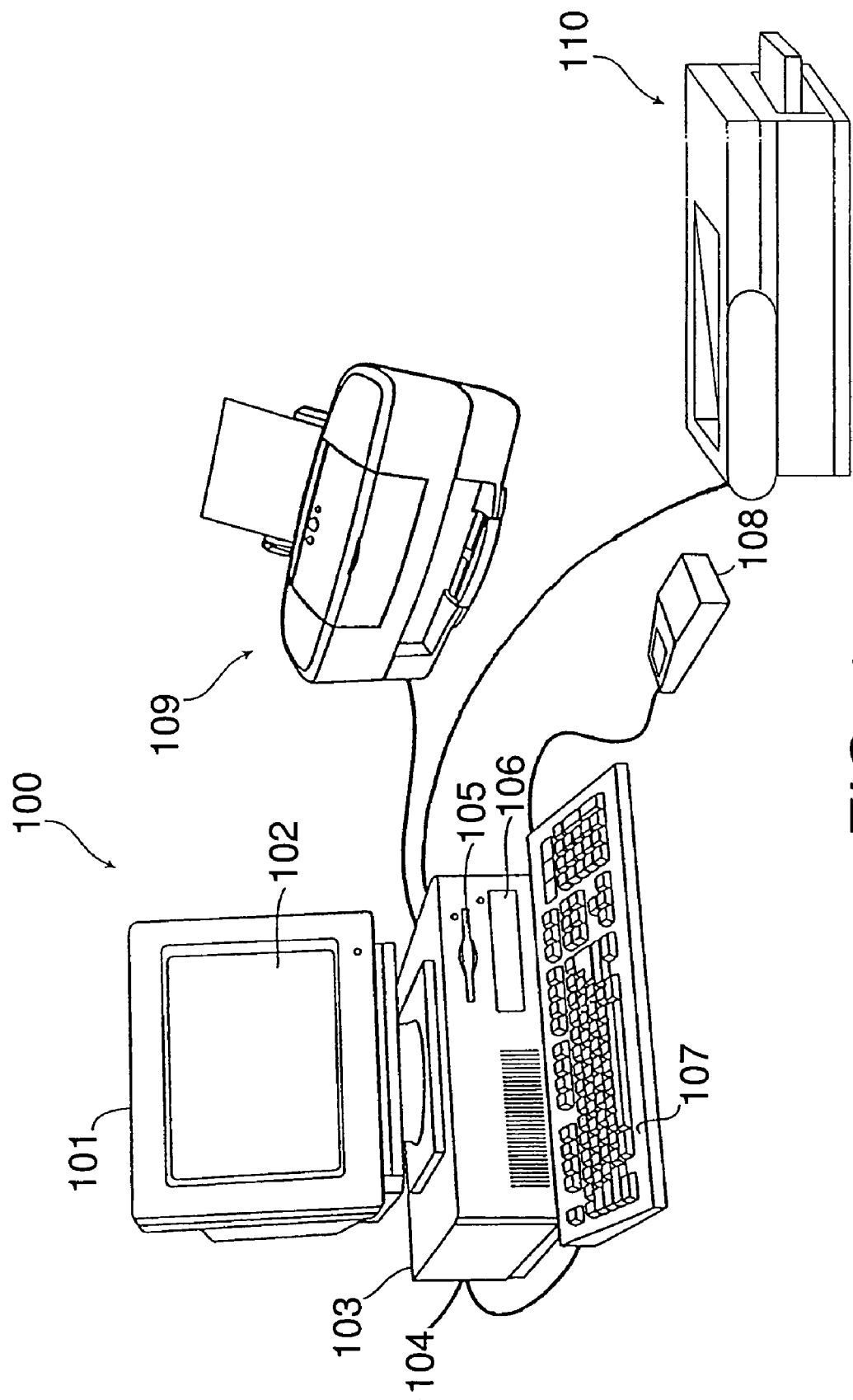
FIG. 1 is a representative view of a computer system in which the present invention may be implemented.

Referring to FIG. 1, a representative view of the outward appearance of a representative computing system including computing equipment, peripherals and digital devices which may be used in connection with the practice of the present invention is shown. Computing equipment 100 includes host processor 103 which comprises a personal computer (hereinafter "PC"). Provided with computing equipment 100 are color monitor 101 including display screen 102, keyboard 107 for entering text data and user commands, and pointing device 108. Pointing device 108 preferably comprises a mouse for pointing and for manipulating objects displayed on display screen 102.

Computing equipment 100 includes a computer readable memory medium such as computer fixed disk 106 and/or floppy disk drive 105. Floppy disk drive 105 provides a means whereby computing equipment 100 can access information, such as image color data, computer-executable process steps, application programs, etc. stored on removable memory media. A similar CD-ROM interface (not shown) may be provided for computing equipment 100 through which computing equipment 100 can access information stored on removable CD-ROM media.

Printer 109 is a first printer which forms color images on a recording medium such as paper or transparencies or the like. Printer 110 is a second printer which also forms color images on a recording medium such as paper or transparencies or the like. Preferably, printer 109 and printer 110 form color images using cyan, magenta, yellow and black inks, although the present invention can be used with printers and devices which use other colorant combinations that include black. The invention is usable with printers that use such colorant combinations, so long as the printer is capable of being interfaced to computing equipment 100.

Figure 2:
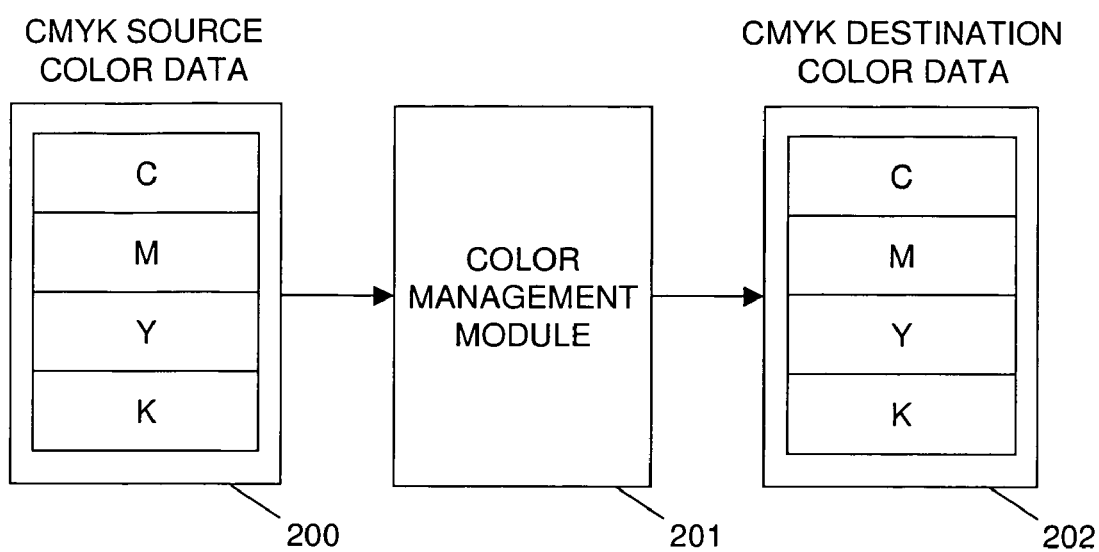
FIG. 2 is a view for providing a general explanation of a color management according to the present invention.

With reference to FIG. 2, a view for providing a general explanation of a color management according to the present invention is shown. The color management system is implemented in color management module (CMM) 201. CMM 201 is applied to CMYK source color data 200 in order to generate CMYK destination color data 202. Specifically, CMYK source color data includes a cyan color component C, magenta color component M, yellow color component Y and black color component K. Each of the aforementioned color components is represented by a value ranging from zero percent to 100 percent. In this manner, each pixel of a source color image can be represented by a CMYK combination, wherein the value of each color component of the color combination represents the amount to which that color component contributes to the color appearance of the pixel.

In general, CMM 201 inspects the values of each of the color components of CMYK source color data 200 and determines if the color components represent a black-only pixel, wherein the C, M and Y components are each equal to zero. In a case where the pixel is black-only, a corresponding pixel in the CMYK destination color data 202 is selected so that the K component of the destination pixel reproduces a lightness of a gamut-mapped colorimetric value, and the C, M and Y components of the destination pixel are set to zero. If the pixel is not black-only, the destination pixel is selected so that a combination of the C, M, Y and K components reproduces the gamut-mapped colorimetric value.

The present invention therefore avoids unwanted color hues and the introduction of color characteristics into otherwise black, gray and/or white pixel data, when rendering a color image from a source device on a destination device. Specifically, the present invention reduces the presence of blurriness and unwanted color appearance in black text and objects, such as lines. The process for transforming a source pixel to a destination pixel is described in more detail with reference to FIG. 3.

Figure 3:
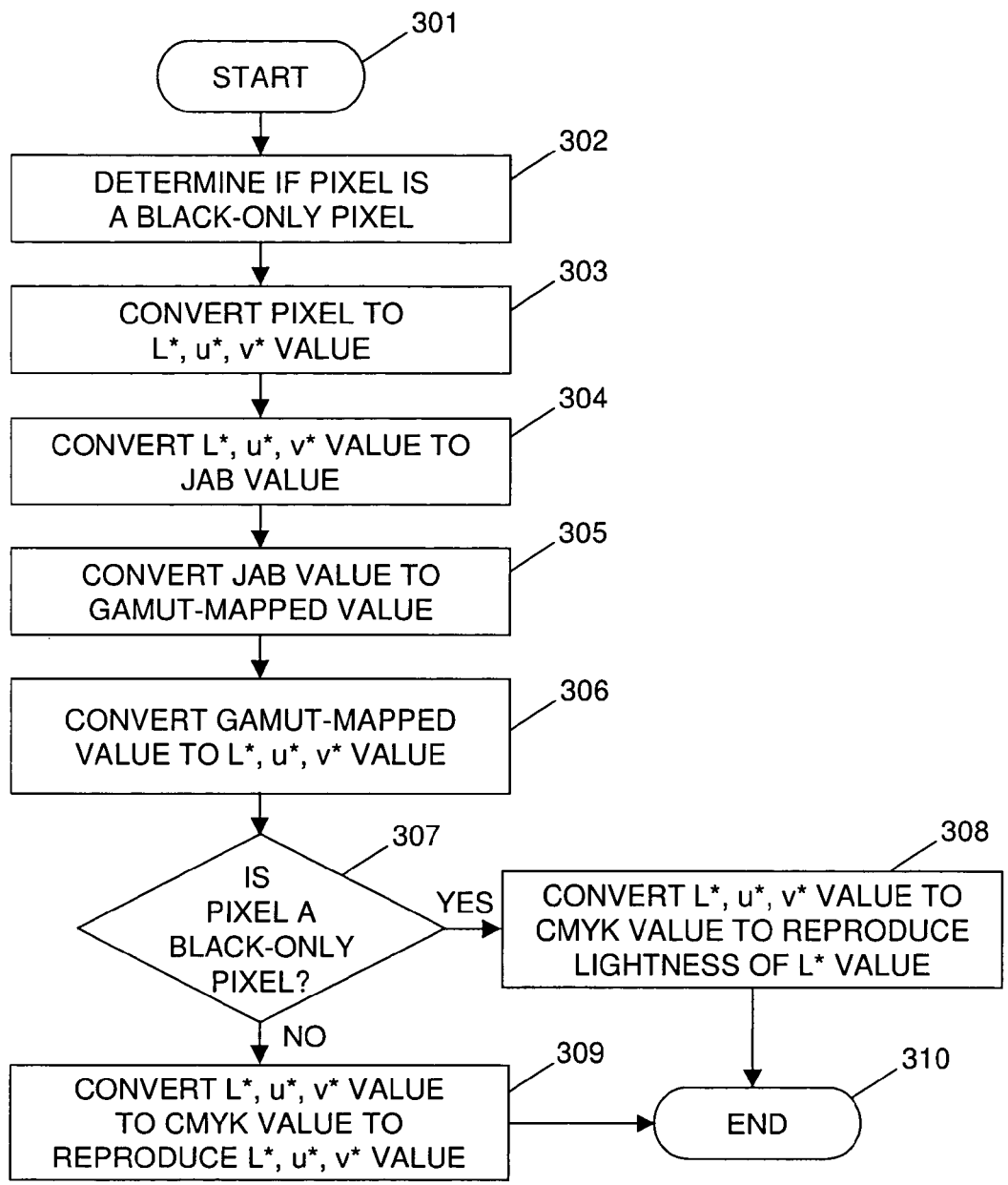
FIG. 3 is a flowchart for transforming a pixel in a source image to a corresponding pixel in a destination image in accordance with the present invention.

Referring now to FIG. 3, a flowchart for transforming a pixel in a source image to a corresponding pixel in a destination image in accordance with the present invention is shown. The pixel in the source image corresponds to a source device colorant value in a source device colorant space, the source device colorant value having non-black colorant values and a black colorant value, and the source device colorant space being colorimetrically characterized by a source device model. The color transformation depicted in FIG. 3 yields a pixel in a destination image which corresponds to a destination device colorant value in a destination device colorant space, the destination device colorant value having non-black colorant values and a black colorant value, and the destination device colorant space being colorimetrically characterized by a destination device model. Although FIG. 3 depicts color transformation from source CMYK to destination CMYK, other colorant spaces having a separate black component, such as CMYKOG, can be used.

Following start bubble 301, a determination is made as to whether the pixel in the source device is black-only (block 302). A pixel is black-only if all of the non-black colorant values of the pixel are zero. If any of the non-black colorant values are not zero, the pixel is not black-only. It should be noted that the black-only determination may be stored as a flag value which can later be used, as described below.

Next, the pixel in the source image is converted from CMYK to an L*, u*, v* value (block 303). The L*, u*, v* value is a colorimetric representation of the original CMYK value.

The L*, u*, v* value is then converted to a JAB value (block 304). JAB represents an appearance equivalent of the L*, u*, v* value, and is obtained by using a color appearance model and the viewing conditions of the source device colorant space.

Next, the JAB value is converted to a gamut-mapped value (block 305). The conversion to a gamut-mapped value is made in accordance with user-selectable gamut-mapping. As mentioned above, user-selectable gamut mapping allows the user to select the algorithm for transforming source color data to destination color data that might otherwise map to an out-of-gamut color in the destination color space.

Examples of user-selectable gamut-mapping are SGCK (sigmoidal lightness compression and chroma compression with knee clipping), HueMap and Lclip. In SGCK, a resulting image is reproduced from an original image, and the resulting image maintains the general appearance of the original image, without a strict desire to preserve the exact colors. The HueMap algorithm is primarily used for computer graphic images. It attempts to preserve the intensity of color without necessarily maintaining the actual hue. The Lclip algorithm maps the lightness of an image so that white maps to white and black maps to black. Colors in between white and black that are not representable on the output printer are shown as a closest match. If there is a color ramp that exceeds the range of the output printer, then the entire part of the color ramp that extends beyond the output gamut will have the same color in the print.

Still referring to FIG. 3, in block 306, the gamut-mapped value is converted to an L*, u*, v* value, which is a colorimetric value. The conversion to L*, u*, v* uses viewing conditions of the destination device. In addition, the conversion allows for the determination of a lightness value, since the L* component of the L*, u*, v* value defines luminance. Although the conversion from the gamut-mapped value to L*, u*, v* involves the computation of L*, u* and v*, only the L* value is used for a black-only pixel, as discussed later.

It should be noted that the conversion from the gamut-mapped value to L*, u*, v* may be effected by first converting the gamut-mapped value to XYZ. Since lightness cannot be directly determined from XYZ, however, and since a determination of lightness is necessary for selecting a proper CMYK value in the destination device for a black-only pixel, the XYZ value should be converted to L*, u*, v*.

After converting to L*, u*, v*, a CMYK value in the destination device is selected in accordance with decision diamond 307. If a flag value was set in block 302, indicating a black-only pixel, the selection is made in accordance with this flag value.

If the pixel in the source device is black-only, the L*, u*, v* value is converted to a CMYK value in which the K component reproduces a lightness of the L* value, and in which the C, M and Y components are set to zero (block 308).

In setting the K value for a black-only pixel, a mapping may be performed that takes into account the lightness of the L* value relative to a lightness in the destination device colorant space. Such a mapping is obtained from the gamut boundary for the destination device, and can be implemented as a table of colors that represent a neutral ramp of the destination device.

The table of colors making up the neutral ramp contains the appearance values for each of a number of black-only colors, and is a feature of the gamut boundary information presented in a color management system of this type. The neutral ramp contains a set of colorant/appearance pairs, each of which contains a colorant value and a color appearance value associated with that colorant value. In the case of CMYK, the colorant value is always composed of K-only colorant combination.

The table representing the neutral ramp is used to look up a given black-only pixel. Specifically, the lightness in appearance space is looked up against the lightness value of the black-only pixel. The result of the lookup is most likely an interpolation interval between a pair of entries in the neutral ramp. Given this interpolation value, a corresponding appearance value of the black-only pixel can be determined, which in turn can be used for reproducing a lightness of the L*, u*, v* value.

Still referring to FIG. 3, if it was determined that the pixel is not a black-only pixel, the L*, u*, v* value is converted to a CMYK value that reproduces the L*, u*, v* value (block 309). In doing so, a combination of C, M, Y and K values are selected to reproduce the L*, u*, v* value, which was previously gamut-mapped. This is followed by end bubble 310.

Figure 4:
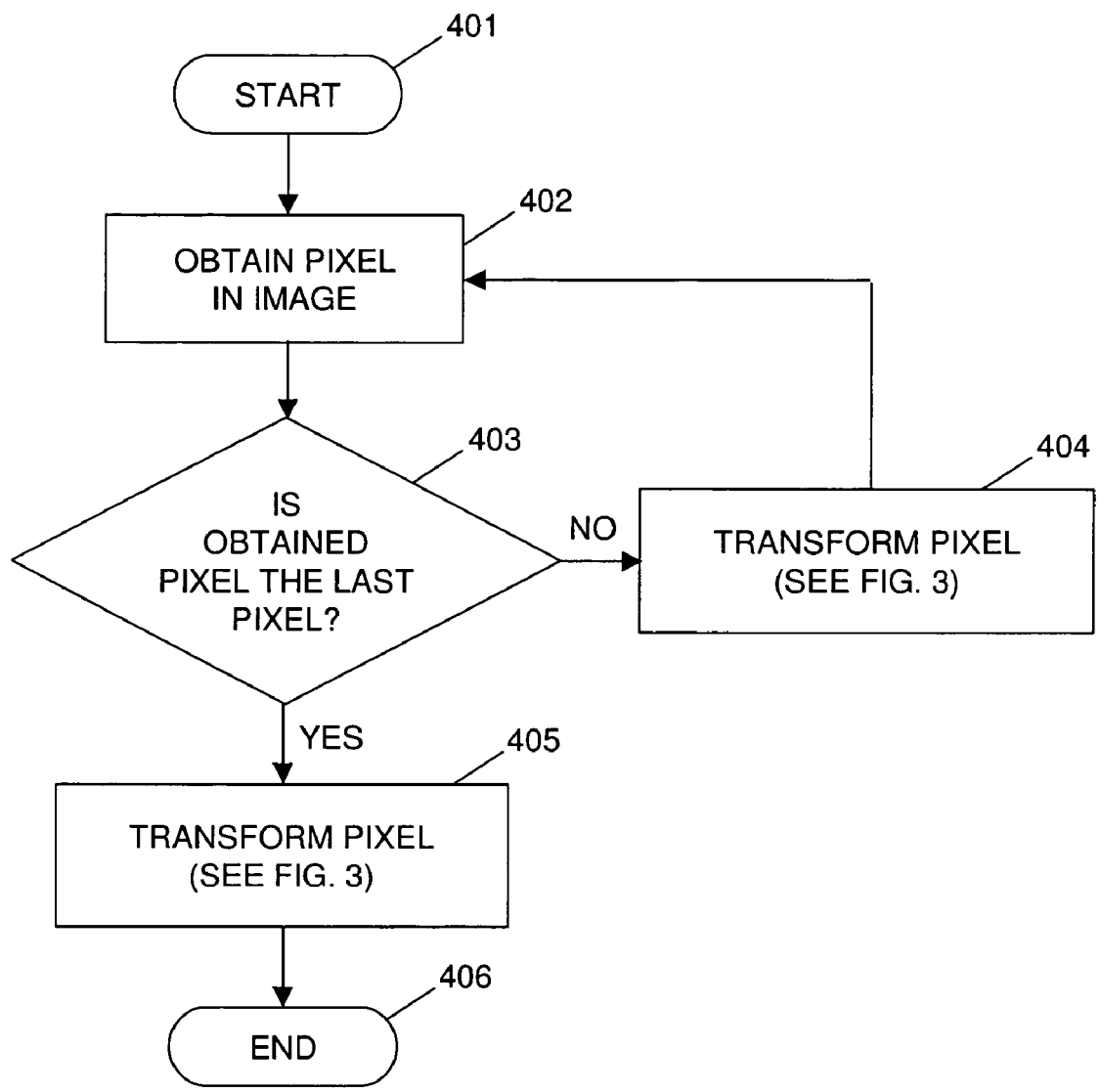
FIG. 4 is a flowchart depicting the transformation of image data of a source device to image data in a destination device in accordance with the present invention.

With reference to FIG. 4, a flowchart depicting the transformation of image data of a source device to image data in a destination device in accordance with the present invention is shown. The image data of the source device corresponds to source device colorant value data in a source device colorant space, the source device colorant value data comprising plural pixels (or source device colorant values), and the source device colorant space being colorimetrically characterized by a source device model. The transformation depicted by FIG. 4 yields image data in the destination device which corresponds to destination device colorant value data in a destination device colorant space, the destination device colorant value data comprising plural pixels (or destination device colorant values), and the destination device colorant space being colorimetrically characterized by a destination device model.

Following start bubble 401, one of the plural pixels is obtained from the source device (block 402). In decision diamond 403, a decision is made as to whether the obtained pixel is the last pixel to be transformed. If not, the pixel is transformed in block 404 according to FIG. 3. When the last pixel is obtained, it is transformed in block 405 according to FIG. 3, which is followed by end bubble 406.

Figure 5:
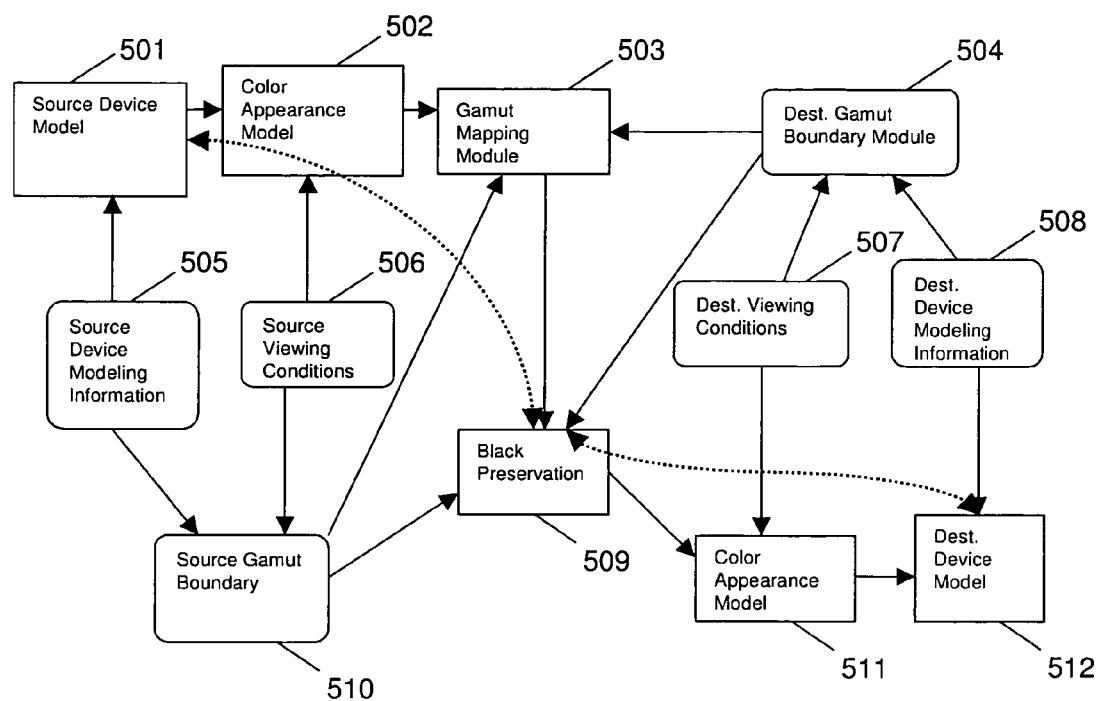
FIG. 5 is a representative view of a computer system with interconnection of data paths in accordance with the present invention.

FIG. 5 is a representative view of software architecture with interconnection of data paths in accordance with the present invention, and emphasizes an object-oriented architecture of this embodiment. Associated with source image data of the computer system are a source device model module 501, color appearance model module 502, source device modeling information module 505, source viewing conditions module 506 and source gamut boundary module 510. Associated with the destination image data are destination device model module 512, color appearance model module 511, destination viewing conditions module 507 and destination gamut boundary module 504. Both the source and image data modules access a common gamut-mapping model module 503, which allows for user-selectable gamut-mapping, and black preservation module 509, which preserves black-only pixels when transforming from source image data to destination image data.

Still referring to FIG. 5, out-of-band information is obtained from the source device model module 501 regarding which of the pixels in the source image are composed completely of black ink (K). The data is considered out-of-band because it is not part of the three channel appearance data. Rather, it may be presented as an extra channel with the appearance data, in a separate buffer not associated with the appearance data, or perhaps through an external interface in a COM module. The obtaining of this out-of-band information can be seen to correspond with the determining of whether a pixel is black-only, as described in FIG. 3.

After gamut-mapping, the black preservation module 509 determines the relative lightness of each of the black-only pixels using a map of lightness versus blackness obtained from the gamut boundary for the destination device. This can be done by accessing the neutral ramp of the destination device, as described in FIG. 3. The black preservation module 509 then modifies the appearance colors for these pixels so as to make them correspond to the equivalent color appearance of the destination device for a corresponding degree of black ink. Finally, the black preservation module 509 presents the information obtained from the source device model module 501 to the destination device model module 512. If information about black-only pixels has been received from the black preservation module 509, this information is used to cause the conversion for the corresponding pixels to be performed using only black ink. Accordingly, black-only content is preserved while accommodating a user-selectable gamut-mapping model.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. In a computerized color management system having a user-selectable gamut mapping model, a method for transforming a source device colorant value in a source device colorant space to a corresponding destination device colorant value in a destination device colorant space, wherein the source and destination device colorant values each have non-black colorant values and a black colorant value, and wherein the source and destination device colorant spaces are colorimetrically characterized by source and destination device models, the method comprising:
   determining, by using a computer, whether all of the non-black colorant values of the source device colorant value are or are not all zero;
   transforming the source device colorant value to a colorimetric value using the source device model;
   transforming the colorimetric value to a gamut-mapped colorimetric value using the user-selectable gamut-mapping model; and
   converting the gamut-mapped colorimetric value to a destination device colorant value, wherein the conversion to the destination device colorant value is based on the determination in the determining step, such that
   in a first case where all of the non-black colorant values of the source device colorant value are determined to be all zero, the gamut-mapped colorimetric value is converted so that the black colorant value of the destination device colorant value reproduces a lightness of the gamut-mapped colorimetric value relative to a gamut boundary for the destination device model, and so that all of the non-black colorant values of the destination device colorant value are zero,
   and in a second case where all of the non-black colorant values of the source device colorant value are determined to be not all zero, the gamut-mapped colorimetric value is converted so that a combination of the non-black and black colorant values of the destination device colorant value reproduces the gamut-mapped colorimetric value.

2. A method according to claim 1, wherein a flag value is set based on whether all of the non-black colorant values of the source device colorant value are zero, and wherein the destination device colorant value is selected in accordance with the flag value.

3. A method according to claim 1, wherein in the first case where all of the non-black colorant values of the source device colorant value are zero, the gamut-mapped colorimetric value is transformed to the destination device colorant value, with the black colorant value of the destination device colorant value reproducing a lightness of the gamut-mapped colorimetric value, and all of the non-black colorant values of the destination device colorant value being zero.

4. A method according to claim 1, wherein in the first case where all of the non-black colorant values of the source device colorant value are zero, the black colorant value of the destination device colorant value reproduces a lightness of the gamut-mapped colorimetric value by obtaining mapping information from the gamut boundary for the destination device model.

5. A method according to claim 4, wherein in the mapping information from the gamut boundary for the destination device model is implemented as a table of colors representing a neutral ramp of the destination device model.

6. A method according to claim 1, wherein the step of transforming the colorimetric value to the gamut-mapped colorimetric value using the user-selectable gamut-mapping model comprises:
transforming the colorimetric value to an appearance space value;
gamut-mapping the appearance space value using the user-selectable gamut-mapping model; and
transforming the appearance space value to the gamut-mapped colorimetric value.

7. A method according to claim 6, wherein the appearance space value is transformed to the gamut-mapped colorimetric value by using a colorimetric space which has a luminance value.

8. A method according to claim 7, wherein the colorimetric space which has a luminance value is L*, u*, v*.

9. A method according to claim 1, wherein the source device colorant space is CMYK and the destination device colorant space is CMYK.

10. A method according to claim 1, wherein the source device model corresponds to a first color printer and the destination device model corresponds to a second color printer.

11. A method according to claim 1, wherein
each of plural source color device colorant values in source device colorant value data is transformed to a corresponding destination device colorant value in accordance with claim 1.

12. A method according to claim 11, wherein a look-up table is generated to store each of the plural source device colorant values and corresponding destination device colorant values.

13. A method according to claim 1, wherein in the first case where all of the non-black colorant values of the source device colorant value are determined to be all zero, and wherein the gamut-mapped colorimetric value is converted so that the black colorant value of the destination device colorant value reproduces a lightness of the gamut-mapped colorimetric value relative to a gamut boundary for the destination device model, and so that all of the non-black colorant values of the destination device colorant value are zero, the gamut-mapped colorimetric value is converted by using a neutral ramp of a destination device.

14. Computer-executable process steps retrievably stored on a computer readable medium, said computer-executable process steps for causing a computer to transform a source device colorant value in a source device colorant space to a corresponding destination device colorant value in a destination device colorant space, said computer-executable process steps comprising process steps executable by the computer to perform a method according to any one of claims 1 to 12.

15. A computer-readable medium which retrievably stores computer-executable process steps, said computer-executable process steps for causing a computer to transform a source device colorant value in a source device colorant space to a corresponding destination device colorant value in a destination device colorant space, said computer-executable process steps comprising process steps executable by the computer to perform a method according to any one of claims 1 to 12.

16. An apparatus for transforming a source device colorant value in a source device colorant space to a corresponding destination device colorant value in a destination device colorant space, the apparatus comprising:
a program memory for storing process steps executable to perform a method according to any one of claims 1 to 12; and
a processor for executing the process steps stored in said program memory.

* * * * *